US012626870B2

(12) United States Patent
Liu et al.

(10) Patent No.: US 12,626,870 B2
(45) Date of Patent: May 12, 2026

(54) CORE PACKAGE, ALUMINUM ELECTROLYTIC CAPACITOR AND PACKAGING METHOD THEREOF

(71) Applicant: HUNAN AIHUA HOLDINGS CO., LTD., Yiyang City (CN)

(72) Inventors: Bo Liu, Yiyang City (CN); Lihua Ai, Yiyang City (CN); Liang Ai, Yiyang City (CN); Anan Wang, Yiyang City (CN)

(73) Assignee: HUNAN AIHUA GROUP CO., LTD., Yiyang City (CN)

( * ) Notice: Subject to any disclaimer, the term of this patent is extended or adjusted under 35 U.S.C. 154(b) by 281 days.

(21) Appl. No.: 18/277,477

(22) PCT Filed: Aug. 24, 2022

(86) PCT No.: PCT/CN2022/114490
§ 371 (c)(1),
(2) Date: Aug. 16, 2023

(87) PCT Pub. No.: WO2024/021210
PCT Pub. Date: Feb. 1, 2024

(65) Prior Publication Data
US 2025/0079091 A1    Mar. 6, 2025

(30) Foreign Application Priority Data
Jul. 29, 2022    (CN) .......................... 202210904879.7

(51) Int. Cl.
*H01G 9/10*        (2006.01)
*H01G 9/00*        (2006.01)
(Continued)

(52) U.S. Cl.
CPC ............. *H01G 9/10* (2013.01); *H01G 9/0029* (2013.01); *H01G 9/008* (2013.01); *H01G 9/045* (2013.01); *H01G 9/145* (2013.01)

(58) Field of Classification Search
CPC ........ H01G 9/145; H01G 9/008; H01G 9/045; H01G 9/10
See application file for complete search history.

(56) References Cited

U.S. PATENT DOCUMENTS 3,197,347 A  *  7/1965  Altenpohl ................ H01G 9/04
29/25.42
2004/0207974 A1 * 10/2004  Uzawa ..................... H01G 9/10
361/518
(Continued)

FOREIGN PATENT DOCUMENTS

CN        101604579 A      12/2009
CN        203553238 U      4/2014
(Continued)

OTHER PUBLICATIONS

Foreign Communication from Related Application—Office Action, Korean Intellectual Property Office, Korean Application No. 10-2023-7014040, dated Jun. 13, 2024, 15 pages.
(Continued)

*Primary Examiner* — David M Sinclair
(74) *Attorney, Agent, or Firm* — Conley Rose, P.C.; Rodney B. Carroll

(57)        ABSTRACT

The present disclosure provides a core package, an aluminum electrolytic capacitor and a packaging method thereof. The core package includes a plurality of first electrode foils and second electrode foils laminated one on another, each of the first electrode foils is an anode foil a cathode foil, and the second electrode foil is the other. Among the plurality of first electrode foils, a first conductive foil is arranged at the edge of each of the first electrode foils, a first portion of the first
(Continued)

conductive foil is electrically coupled to the corresponding first electrode foil, and a second portion of the first conductive foil extends and protrudes relative to the corresponding first electrode foil; and the plurality of first conductive foils are connected to a first conductive foil strip through the second portion; and an oxide film is formed on a surface of the first conductive foil.

19 Claims, 7 Drawing Sheets

(51) Int. Cl.
  H01G 9/008 (2006.01)
  H01G 9/045 (2006.01)
  H01G 9/145 (2006.01)

(56) References Cited

U.S. PATENT DOCUMENTS

| | | | | |
|---|---|---|---|---|
| 2005/0081370 | A1* | 4/2005 | Kurihara | H01G 11/52 |
| | | | | 29/623.5 |
| 2008/0190647 | A1 | 8/2008 | Itoh | |
| 2009/0310284 | A1 | 12/2009 | Kee | |
| 2015/0079436 | A1 | 3/2015 | Chung et al. | |
| 2016/0268064 | A1 | 9/2016 | Ishikawa et al. | |
| 2017/0005318 | A1 | 1/2017 | Otohata | |
| 2022/0290011 | A1* | 9/2022 | Kato | B32B 15/088 |

FOREIGN PATENT DOCUMENTS

| | | | |
|---|---|---|---|
| CN | 105551806 | A | 5/2016 |
| CN | 110828179 | A | 2/2020 |
| CN | 110828180 | A | 2/2020 |
| CN | 110957137 | A | 4/2020 |
| CN | 112420392 | A | 2/2021 |
| CN | 213905465 | U | 8/2021 |
| CN | 113539690 | A | 10/2021 |
| CN | 114724857 | A | 7/2022 |
| EP | 2214186 | B1 | 3/2014 |
| JP | 02155221 | A | 6/1990 |
| JP | H04223317 | A | 8/1992 |
| JP | 2004304010 | A | 10/2004 |
| JP | 2006108184 | A | 4/2006 |
| JP | 2006324174 | A | 11/2006 |
| JP | 2007273912 | A | 10/2007 |
| JP | 2008028074 | A | 2/2008 |
| JP | 2010177515 | A | 8/2010 |
| JP | 2011049390 | A | 3/2011 |
| JP | 5413586 | B2 | 2/2014 |
| JP | 2015159210 | A | 9/2015 |
| JP | 2015526858 | A | 9/2015 |
| JP | 2016152231 | A | 8/2016 |
| KR | 20120040671 | A | 4/2012 |
| KR | 101286910 | B1 | 7/2013 |
| KR | 20140022531 | A | 2/2014 |
| TW | 200715321 | A | 4/2007 |
| WO | 2014128909 | A1 | 8/2014 |
| WO | 2015147066 | A1 | 10/2015 |

OTHER PUBLICATIONS

Foreign Communication from Related Application—International Search Report and Written Opinion of the International Searching Authority, International Application No. PCT/CN2022/114490, dated Jan. 11, 2023, 9 pages.

Foreign Communication from Related Application—First Office Action, Taiwan Intellectual Property Office, Taiwan Application No. 112122384, dated Dec. 4, 2023, 13 pages.

Foreign Communication from Related Application—Office Action, State Intellectual Property Office of People's Republic of China, Chinese Application No. 202210904879.7, dated Mar. 2, 2025, 17 pages.

Foreign Communication from Related Application—Office Action, Korean Intellectual Property Office, Korean Application No. 10-2023-7014040, dated Feb. 10, 2025, 16 pages.

Foreign Communication from Related Application—Search Report and Written Opinion, Intellectual Property Office of Singapore, Singapore Application No. 11202306116S, dated Sep. 3, 2025, 13 pages.

Foreign Communication from Related Application—Office Action with English Translation, Japan Patent Office, Japanese Application No. 2025-505480, dated Jan. 5, 2026, 14 pages.

* cited by examiner

600

400

500

CORE PACKAGE, ALUMINUM ELECTROLYTIC CAPACITOR AND PACKAGING METHOD THEREOF

CROSS-REFERENCE TO RELATED APPLICATIONS

This application is the U.S. national phase of PCT Application No. PCT/CN2022/114490 filed on Aug. 24, 2022 which claims priority to Chinese Patent Application No. 202210904879.7 filed on Jul. 29, 2022, the disclosures of which are incorporated in their entirety by reference herein.

TECHNICAL FIELD

The present disclosure relates to the field of capacitor technology, in particular to a core package, an aluminum electrolytic capacitor and a packaging method thereof.

BACKGROUND

A traditional aluminum electrolytic capacitor is usually made of winding core package, which is assembled with aluminum shell, rubber plug and other accessories after immersion. With the miniaturization and flattening of electronic products, the traditional cylindrical aluminum electrolytic capacitor has no advantage in space utilization and restricts the development of miniaturization and flattening of the electronic products. Based on the application limitation of cylindrical aluminum electrolytic capacitors, square aluminum electrolytic capacitors have been developed in the market, which can effectively meet the requirements of miniaturization and flat structure of electronic products. However, performance of aluminum electrolytic capacitors may not be achieved through a capacitance extraction structure of an anode foil and a cathode foil in the current square aluminum electrolytic capacitor. In the prior art, for example, due to properties of anode foil material, it is difficult to realize a direct connection between a conductive foil strip for capacitance extraction and an anode foil, and the structure of the anode foil is damaged; for another example, a connection portion between the conductive foil strip and the anode foil is heated due to current accumulation. As a result, the performance of aluminum electrolytic capacitors may not be achieved.

SUMMARY

An object of the present disclosure is to provide a core package, an aluminum electrolytic capacitor and a packaging method thereof, so as to solve the problem that the performance of aluminum electrolytic capacitors may not be achieved through the capacitance extraction structure of the square aluminum electrolytic capacitors in the prior art.

The present disclosure provides in some embodiments a core package, including a plurality of first electrode foils and a plurality of second electrode foils laminated one on another, wherein every two adjacent first electrode foils are spaced by one of the plurality of second electrode foils, every two adjacent second electrode foils are spaced by one of the plurality of first electrode foils, the first electrode foil and the second electrode foil adjacent to each other are spaced by an electrolytic paper; and each of the first electrode foils is either of an anode foil and a cathode foil, and each of the second electrode foils is the other of the anode foil and the cathode foil. Among the plurality of first electrode foils, a first conductive foil is arranged at an edge of each of the first electrode foils, a first portion of the first conductive foil is electrically coupled to the corresponding first electrode foil, and a second portion of the first conductive foil extends and protrudes relative to the corresponding first electrode foil; and a plurality of first conductive foils are connected to one first conductive foil strip through the second portion. An oxide film is formed on a surface of the first conductive foil.

In a possible embodiment of the present disclosure, among the plurality of second electrode foils, a second conductive foil is arranged at an edge of each of the second electrode foils, a first portion of the second conductive foil is electrically coupled to the corresponding second electrode foil, and a second portion of the second conductive foil extends and protrudes relative to the corresponding second electrode foil; and a plurality of second conductive foils are connected to one second conductive foil strip through the second portion. An oxide film is formed on a surface of the second conductive foil.

In a possible embodiment of the present disclosure, the first conductive foil is made of pure aluminum, and properties of the oxide film on the surface of the first conductive foil are the same as properties of an oxide film on a surface of the first electrode foil.

In a possible embodiment of the present disclosure, the oxide film is formed on the surface of the first conductive foil through a chemical formation process, and the chemical formation process used for forming the oxide film on the surface of the first conductive foil is the same as a chemical formation process used for forming the oxide film on the surface of the first electrode foil.

In a possible embodiment of the present disclosure, the first electrode foil is the anode foil and the second electrode foil is the cathode foil; and each of the cathode foils includes a main body portion and an electrode tab portion formed integrally, the electrode tab portion protrudes relative to an edge of the main body portion, and a plurality of cathode foils are connected to one third conductive foil strip through the electrode tab portion.

In a possible embodiment of the present disclosure, each of the first electrode foils includes a main body portion and an electrode tab portion formed integrally, the electrode tab portion protrudes relative to an edge of the main body portion, and the first portion of the first conductive foil is connected to the first electrode foil through the electrode tab portion. The electrode tab portions of the plurality of first electrode foils are staggered in sequence along a first direction.

In a possible embodiment of the present disclosure, the plurality of first conductive foils are arranged in sequence along a first direction, and the second portions of two adjacent first conductive foils are attached to each other.

In a possible embodiment of the present disclosure, a thickness of the first conductive foil ranges from 5 μm to 50 μm.

In a possible embodiment of the present disclosure, the first portion of the first conductive foil is connected to the first electrode foil through one of riveting, welding, and conductive adhesive.

The present disclosure further provides in some embodiments an aluminum electrolytic capacitor, including the above-mentioned core package.

In a possible embodiment of the present disclosure, the aluminum electrolytic capacitor further includes a first shell made of aluminum material with an opening at one end, and the core package is arranged inside the first shell; and the opening is provided with a first packaging cover plate, the first packaging cover plate is provided with a wiring post, and the first conductive foil strip is connected to the wiring post on the first packaging cover plate.

In a possible embodiment of the present disclosure, a size and a shape of the first shell are compatible with a size and a shape of the core package.

In a possible embodiment of the present disclosure, the aluminum electrolytic capacitor further includes a packaging bag made of an aluminum-plastic film, the packaging bag is formed as an accommodation cavity, an edge of the accommodation cavity is sealed, the core package is sealed inside the packaging bag, and the first conductive foil strip extends to the outside of the packaging bag by passing through a first sealing edge of the packaging bag.

In a possible embodiment of the present disclosure, the aluminum electrolytic capacitor further includes a second shell made of the aluminum material with an opening at one end, and the packaging bag containing the core package is arranged inside the second shell; and a second packaging cover plate is arranged at the opening, a wiring post is arranged on the second packaging cover plate, and the first conductive foil strip is connected to the wiring post on the second packaging cover plate.

In a possible embodiment of the present disclosure, the aluminum electrolytic capacitor further includes a second shell formed integrally, the packaging bag is arranged inside the second shell, the first conductive foil strip extends to the outside of the second shell, and the first conductive foil strip is sealed and insulated from the second shell.

In a possible embodiment of the present disclosure, the packaging bag further includes an airbag structure spaced apart from the accommodation cavity through an isolation strip; the isolation strip is provided with an exhaust structure connecting the airbag structure with the accommodation cavity; and inside the second shell, the airbag structure is arranged at one side of the accommodation cavity, and a direction from the accommodation cavity to the airbag structure is a direction along which the plurality of first electrode foils and the plurality of second electrode foils are laminated one on another.

In a possible embodiment of the present disclosure, a pressing clip is further arranged inside the second shell, the pressing clip holds the accommodation cavity, and the airbag structure is arranged at one side of the pressing clip.

In a possible embodiment of the present disclosure, the isolation strip is opposite to the first sealing edge of the packaging bag, or the isolation strip is arranged at a side of the first sealing edge adjacent to the isolation strip.

In a possible embodiment of the present disclosure, a width of a second sealing edge of the packaging bag is greater than a width of the first sealing edge; and the second sealing edge is arranged at both sides of the first sealing edge.

In a possible embodiment of the present disclosure, the second sealing edge includes at least two sealing isolation strips.

The present disclosure further provides in some embodiments a packaging method, for the above-mentioned aluminum electrolytic capacitor. The method includes: arranging the core package in an accommodation cavity of a packaging bag, a first conductive foil strip of the core package penetrating out of an opening of the packaging bag, and the packaging bag being made of an aluminum-plastic film; and thermally sealing the packaging bag at the opening to form a first sealing edge, and connection colloid on the first conductive foil strip is thermally sealed with the packaging bag.

In a possible embodiment of the present disclosure, the packaging bag further includes an airbag structure spaced apart from the accommodation cavity through a sealing isolation strip, the sealing isolation strip is provided with an exhaust structure connecting the airbag structure with the accommodation cavity, and the method further includes: folding the airbag structure to one side of the packaging bag; arranging the packaging bag with the folded airbag structure in a second shell; arranging a second packaging cover plate at the opening of the second shell and connecting the first conductive foil strip with a wiring post on the second packaging cover plate; and sealing the second packaging cover plate to seal the packaging bag inside the second shell.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In order to solve the problem that the performance of aluminum electrolytic capacitors may not be guaranteed due to the capacitance extraction structure of the square aluminum electrolytic capacitors in the prior art, the present disclosure provides in some embodiments a core package, a plurality of first electrode foils of the core package is connected to first conductive foil strips through first conductive foils, so as to achieve the capacitance extraction of the first electrode foils. A connection area between the first conductive foil and the first electrode foil is large and easy to be realized, so as to effectively guarantee the performance of the aluminum electrolytic capacitor. In addition, the oxide film is formed on the first conductive foil, it is able to avoid the problem that the performance of aluminum electrolytic capacitors may not be guaranteed due to a large amount of heat generated at the connection portion due to current accumulation.

Figure 1:
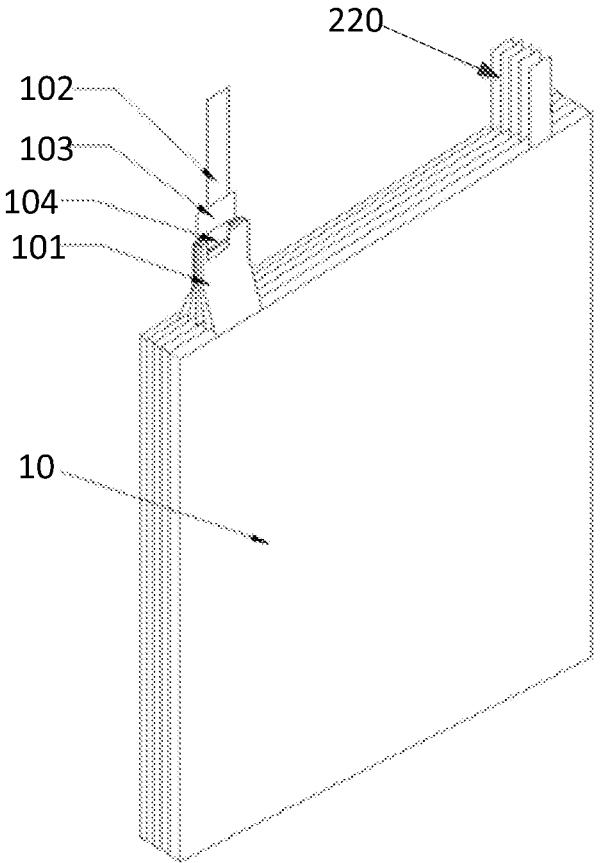
FIG. 1 is a schematic view showing a core package according to an embodiment of the present disclosure.
Figure 2:
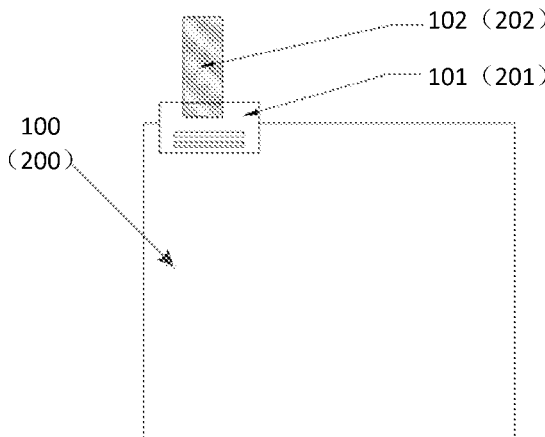
FIG. 2 is a schematic view showing a first electrode foil.
Figure 3:
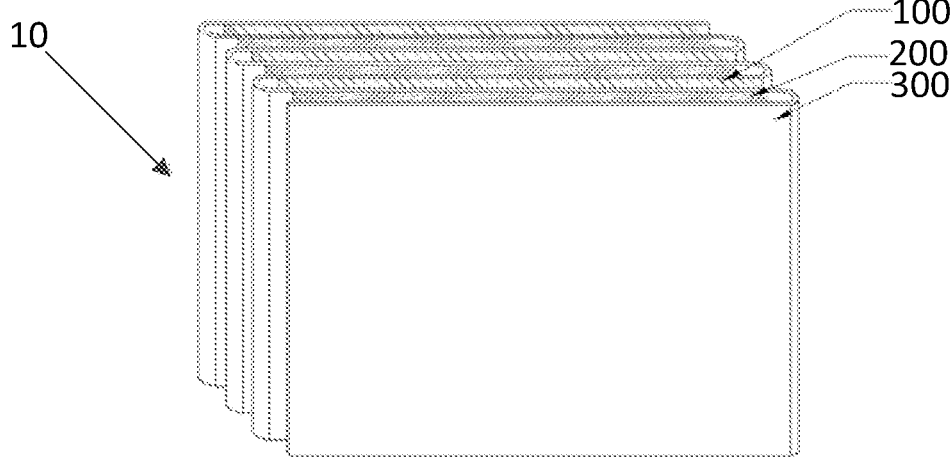
FIG. 3 is another schematic view showing the core package according to an embodiment of the present disclosure.

As shown in FIG. 1 to FIG. 3, in the embodiments of the present disclosure, the core package 10 includes: a plurality of first electrode foils 100 and a plurality of second electrode foils 200 laminated one on another. Two adjacent first electrode foils 100 are spaced by one of the second electrode foils 200, two adjacent second electrode foils 200 are spaced by one of the first electrode foils 100, each of the first electrode foils 100 and each of the second electrode foils 200 adjacent to each other are spaced by electrolytic paper 300; and each of the first electrode foils 100 is either of an anode foil and a cathode foil, and each of the second electrode foils 200 is the other of the anode foil and the cathode foil. Among the plurality of first electrode foils 100, a first conductive foil 101 is arranged at the edge of each of the first electrode foils 100, a first portion of the first conductive foil 101 is electrically coupled to the corresponding first electrode foil 100, and a second portion of the first conductive foil extends and protrudes relative to the corresponding first electrode foil 100; and a plurality of first conductive foils are connected to a first conductive foil strip 102 through the second portion. An oxide film is formed on a surface of the first conductive foil 101.

In the embodiments of the present disclosure, in one aspect, the capacitance extraction of the plurality of first electrode foils 100 is achieved through the first conductive foil 101, and an oxide film ($Al_2O_3$) is formed on the first conductive foil 101. During an aging test, it is able to repair the oxide films damaged at an electrical connection portion between the first conductive foil 101 and the first electrode foil 100 due to the connection; the oxide film is formed on the first conductive foil 101, so that during the use of the capacitor, there will not be a large amount of heat due to the current accumulation caused by the electrolyte repairing the oxide film on the first conductive foil.

In the embodiments of the present disclosure, the first conductive foil 101 is made of high-purity aluminum material with thin thickness, e.g., a thickness of the first conductive foil 101 ranges from 5 μm to 50 μm. When the first conductive foil 101 is provided with above structural properties, the connection, e.g. by laser welding, between the first electrode foils 100 is easy to be realized, and more stable connection and stronger transverse tensile capacity is achieved due to a large laser welding area of the first conductive foil 101 and the first electrode foil 100.

In another aspect, in a capacitor in the prior art, the capacitance extraction is achieved through an electrode foil being directly coupled to a conductive foil strip by a riveting method, and the electrical connection between the electrode foil and the conductive foil strip merely depends on a connection portion, resulting in large equivalent series resistance (ESR) and poor ripple current resistance performance of the capacitor. In the embodiments of the present disclosure, the first conductive foil strip 102 and the first conductive foil 101 as well as the first conductive foil 101 and the first electrode foil 100 may be connected by welding, such as laser welding, it is able to obtain a large electrical connection area, so as to effectively reduce the resistance at the electrical connection portion, thereby to avoiding large ESR of the capacitor and poor ripple current resistance performance of the capacitor.

In this regard, the first conductive foil strip 102 may be coupled to the first electrode foil 100 through the first conductive foil 101. Compared with the capacitor in the prior art in which the capacitance extraction is achieved through the electrode foil being directly coupled to the conductive foil strip by the riveting method, it is able to avoid large ESR of the capacitor and poor ripple current resistance performance of the capacitor when the electrical connection between the electrode foil and the conductive foil strip merely depends on the connection portion.

It should be appreciated that, the first portion and the second portion of the first conductive foil 101 are merely used to distinguish different portions of the first conductive foil 101, both of them are substantially integrally formed as the first conductive foils 101, and there is no boundary on the first conductive foil between the first portion and the second portion.

In the embodiments of the present disclosure, the first conductive foil 101 is made of high-purity aluminum material and is formed on the surface of the first conductive foil through a chemical formation process, and the chemical formation process used for forming the oxide film on the surface of the first conductive foil 101 is the same as a chemical formation process used for forming the oxide film on the surface of the first electrode foil 100.

In this embodiment, the first conductive foil 101 is an aluminum foil, and the oxide film is formed on the surface of the first conductive foil 101 through the chemical formation process, that is, oxide films are formed on both the first electrode foil and the first conductive foil. When the first electrode foils are electrically coupled to the first conductive foils, the oxide films at the connection portion between the first electrode foil and the first conductive foil are damaged and coupled to each other. The damaged oxide films on the surfaces of the first electrode foil and the first conductive foil are repaired when subjected to the aging test during the production of the capacitor. Due to the oxide film arranged on the first conductive foil, after the production of the capacitor is completed, there will not be a large amount of heat due to the current accumulation caused by the electrolyte repairing the oxide film on the first conductive foil.

In addition, different from the oxide film formed on the conductive foil in the prior art, a conventional conductive foil may not achieve the welding connection among the electrode foils. In the embodiments of the present disclosure, the first conductive foil on which the oxide film is formed is made of solid high-purity aluminum with a thin thickness, thereby to achieve the electrical connection between the first conductive foil and the first electrode foil.

Because the first conductive foil 101 is an aluminum foil, the chemical formation process for the first conductive foil is the same as the chemical formation process for first electrode foil 100, i.e., the chemical formation process performed on the surface of the first conductive foil is the same as the chemical formation process performed on the surface of the first electrode, so that after the same surface chemical formation process is performed, the surface properties of the first conductive foil 101 are the same as the surface properties of the connected first electrode foil 100, so as to avoid the problem of current accumulation at the connection portion and heating when the capacitance extraction is achieved by the first conductive foil 101 during the use of the aluminum electrolytic capacitor.

In the embodiments of the present disclosure, the first electrode foil 100 is either of an anode foil and a cathode foil, and the second electrode foil 200 is the other of the anode foil and the cathode foil. That is, in a possible embodiment of the present disclosure, either of the anode foil and the cathode foil in the core package 10 may adopt the capacitance extraction structure in the able embodiments. To be specific, the capacitance extraction of the first electrode foil 100 is achieved through forming a first conductive foil with the same properties as the oxide film displayed by the connected first electrode foil on the surface thereof.

In a possible embodiment of the present disclosure, as shown in FIG. 2, among the plurality of second electrode foils 200, a second conductive foil 201 is arranged at an edge of each of the second electrode foils 200, a first portion of the second conductive foil 201 is electrically coupled to the corresponding second electrode foil 200, and a second portion of the second conductive foil 201 extends and protrudes relative to the corresponding second electrode foil 200; and a plurality of second conductive foils 201 is connected to one second conductive foil strip 202 through the second portion; and an oxide film is formed on a surface of the second conductive foil 201.

In a possible embodiment of the present disclosure, properties of the oxide film on the surface of the second conductive foil are the same as properties of an oxide film on a surface of the connected second electrode foil.

In this embodiment, the capacitance extraction of the anode foil and the cathode foil in the core package 10 are achieved by providing conductive foils respectively.

For example, the first electrode foils 100 are anode foils, the second electrode foils 200 are cathode foils, a first conductive foil 101 is arranged at an edge of each of the anode foils, a first portion of the first conductive foil 101 is electrically coupled to the corresponding first electrode foil 100, and a plurality of first conductive foils 101 are connected to one first conductive foil strip 102 through the second portion; and a second conductive foil 201 is arranged at an edge of each of the cathode foils, the second conductive foil 201 is electrically coupled to the corresponding second electrode foil 200, a plurality of second conductive foils 201 are connected to one second conductive foil strip 202 through the second portion.

According to the above schemes, as shown in FIG. 1, the plurality of first conductive foils 101 are connected to each other and then coupled to the first conductive foil strip 102, e.g., coupled to the first conductive foil strip 102 at the connection portion 104; and the plurality of second conductive foils 201 are connected to each other and then coupled to the second conductive foil strip 202, so as to achieve the capacitance extraction of the anode foils and the cathode foils of the core package 10.

Figure 4:
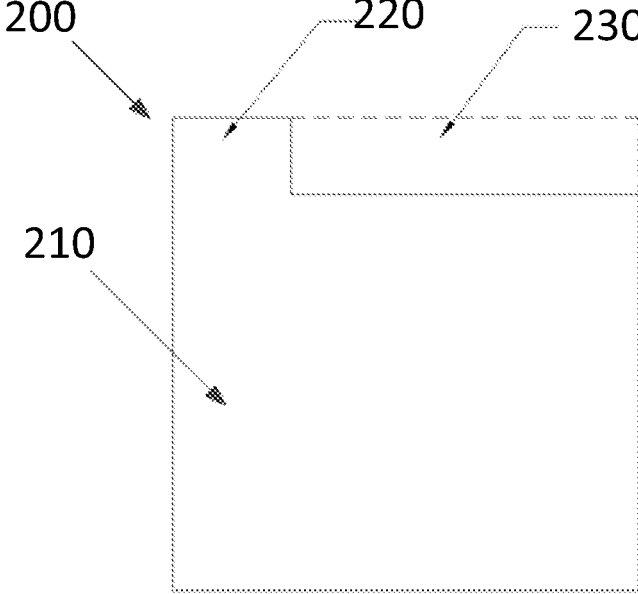
FIG. 4 is a schematic view showing a second electrode foil.

According to the core package in another embodiment of the present disclosure, as shown in FIG. 1 and in combination with FIG. 4, the first electrode foils 100 are the anode foils and the second electrode foils 200 are the cathode foils; and each of the cathode foils includes a main body portion 210 and an electrode tab portion 220 formed integrally, the electrode tab portion 220 protrudes relative to an edge of the main body portion 210, and a plurality of cathode foils are connected to one third conductive foil strip (not shown) through the electrode tab portion 220.

In this embodiment, the manufacturing material cost and manufacturing process of the cathode foil is difference from those of the anode foil, there is no need to enable the capacitance extraction structure of the cathode foil to be the same as that of the anode foil, and the capacitance extraction of the cathode foil may be achieved through providing an electrode tab portion 220 shown in FIG. 4.

The cathode foil may be formed into the electrode tab portion 220 through cutting off a portion 230 of the quadrangular base material, and the quadrangular portion excluding the electrode tab portion 220 constitutes the main body portion 210 of the cathode foil, so as to achieve a capacitor function.

In a possible embodiment of the present disclosure, a thickness of the first conductive foil 101 ranges from 5 μm to 50 μm, optionally ranges from 10 μm to 30 μm; and a width of the first conductive foil 101 ranges from 5 μm to 50 μm, optionally ranges from 10 μm to 20 μm. The width of the first conductive foil 101 is a width in the direction of the edge of the first conductive foil 101 set along the first electrode foil 100.

In another embodiment of the present disclosure, when the capacitance extraction of the second electrode foil 200 is performed through the second conductive foil 201, a thickness of the second conductive foil 201 also ranges from 5 μm to 50 μm, optionally ranges from 10 μm to 30 μm; and a width of the second conductive foil 201 ranges from 5 μm to 50 μm, optionally ranges from 10 μm to 20 μm.

In the embodiments of the present disclosure, the thickness of the first conductive foil 101 or the second conductive foil 201 electrically coupled to the anode foil merely ranges from 5 μm to 50 μm, preferably ranges from 5 μm to 20 μm; and is much less than that the thickness of anode foil. When the plurality of first electrode foils and the plurality of second electrode foils of the core package 10 are laminated one on another, the thickness of the connection portion between the anode foil and the first conductive foil 101 or between the anode foil and the second conductive foil 201 will not be increased greatly due to the setting of the first conductive foil 101 or the second conductive foil 201, so as to avoid the uneven contact surface between the anode foil and the electrolytic paper, thereby to prevent affecting the overall performance, e.g., stability and capacity extraction, of the core package 10.

In the embodiments of the present disclosure, the first portion of the first conductive foil 101 is connected to the first electrode foil 100 through one of riveting, welding, and conductive adhesive; similarly, the first portion of the second conductive foil 201 is connected to the second electrode foil 200 through one of riveting, welding, and conductive adhesive.

In a possible embodiment of the present disclosure, the riveting may be any of cold riveting, hot riveting or puncture riveting; and the welding may be laser welding. In order to ensure the smoothness of the connection between the first conductive foil 101 and the second conductive foil 201, the first conductive foil 101 is connected to the first electrode foil 100 by laser welding, and the second conductive foil 201 is connected to the second electrode foil 200 by laser welding.

In a possible embodiment of the present disclosure, the electrical connection process among the plurality of first conducting foils 101 as well as between the plurality of first conductive foils 101 and the first conductive foil strip 102 is ultrasonic welding.

Figure 5:
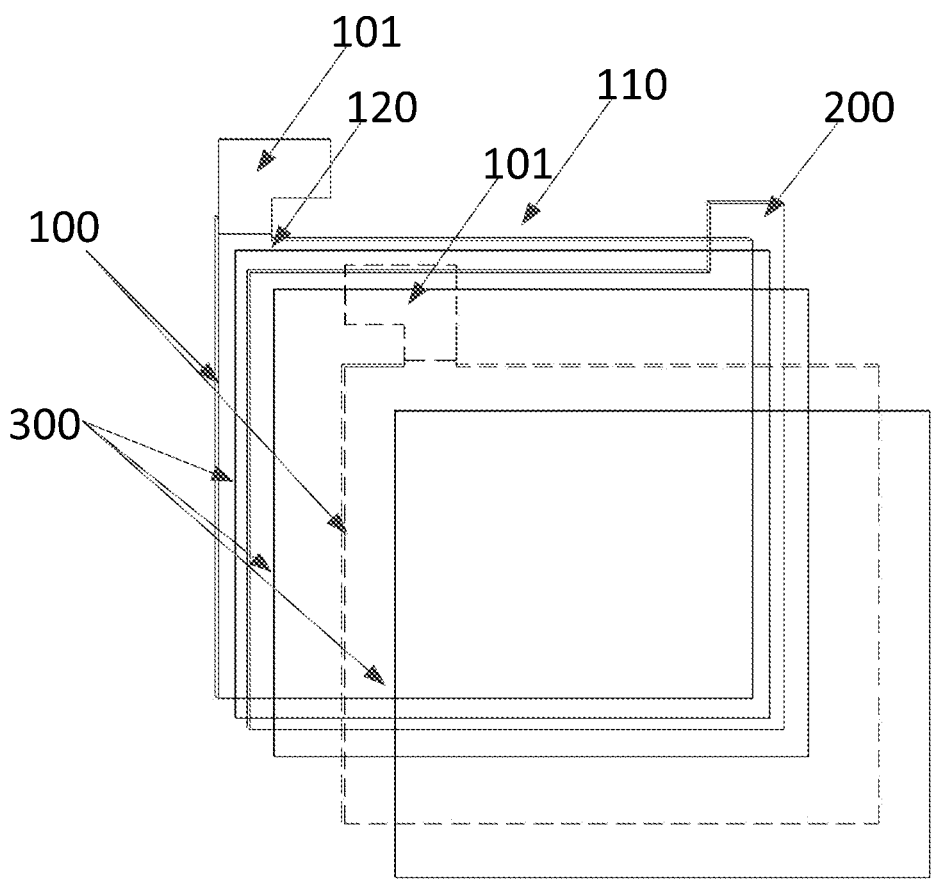
FIG. 5 is yet another schematic view showing the core package according to an embodiment of the present disclosure.

In the embodiments of the present disclosure, as shown in FIG. 5, each of the first electrode foils 100 includes a main body portion 110 and an electrode tab portion 120 formed integrally, the electrode tab portion 120 protrudes relative to an edge of the main body portion 110, and the first portion of the first conductive foil 101 is connected to the first electrode foil 100 through the electrode tab portion 120; and the electrode tab portions 120 of the plurality of first electrode foils 100 are staggered in sequence along a first direction.

In a possible embodiment of the present disclosure, the first direction is an extending direction of one of the edges of the first electrode foil 100.

In a possible embodiment of the present disclosure, a protruding width of the electrode tab portion 120 relative to the main body portion 110 ranges from 3 mm to 5 mm.

In the embodiments of the present disclosure, the plurality of first conductive foils 101 are arranged along the first direction in sequence, and the second portions of two adjacent first conductive foils 101 are attached to each other.

In this embodiment, the plurality of first conductive foils 101 may be coupled to the first electrode foil 100 through the electrode tab portions 120 of the first electrode foil 100. Because the electrode tab portions 120 of the plurality of first electrode foils 100 are staggered in sequence along a first direction, the plurality of first conductive foils 101 are arranged along the first direction in sequence, thereby to avoid the problem that, the connection between the plurality of first conductive foils 101 and the first electrode foils 100 are laminated one on another at one position, and the thickness of the connection portion between the first conductive foils 101 and the first electrode foils 100 is increased, due to the first electrode foils 100 are laminated one on another.

In the embodiments of the present disclosure, the first conductive foil strip 102 and the second conductive foil strip 202 may adopt an electrode tab respectively, and a structure of the electrode tab may be the same as a structure of an electrode tab in a lithium ion battery, e.g., including a conductive sheet and electrode tab adhesive arranged on the conductive sheet.

In the embodiments of the present disclosure, one first conductive foil 101 is electrically coupled to each anode foil, the first conductive foils 101 on the plurality of anode foils are laminated one on another and electrically coupled to each other, and the plurality of first conductive foils 101 is electrically coupled to one first conductive foil strip 102. Similarly, when the capacitance extraction of the cathode foil is achieved by a conductive foil, one second conductive foil 201 is electrically coupled to each cathode foil, the second conductive foils 201 on the plurality of cathode foils are laminated one on another and electrically coupled to each other, and the plurality of second conductive foils 201 is electrically coupled to one second conductive foil strip 202.

In a possible embodiment of the present disclosure, as shown in FIG. 3, the electrolytic paper 300 is connected to the core package 10 integrally to form a Z-shaped structure with a plurality of layers parallel to each other and coupled in sequence, the first electrode foil 100 and the second electrode foil 200 are arranged between two adjacent layers of the electrolytic paper 300 respectively, two adjacent first electrode foils 100 are spaced by one of the second electrode foils 200, and two adjacent second electrode foils 200 are spaced by one of the first electrode foils 100.

In the embodiments of the present disclosure, in order to achieve that the electrolytic paper 300 effectively isolates the first electrode foil 100 and the second electrode foil 200, opposite ends of the electrolytic paper 300 extend and protrude relative to the first electrode foil 100 and the second electrode foil 200, i.e., an area of the electrolytic paper 300 facing the first electrode foil 100 or the second electrode foil

200 is greater than an area of the first electrode foil 100 or the second electrode foil 200.

In the embodiments of the present disclosure, in the first electrode foil 100 and the second electrode foil 200, the size of the cathode foil is slightly greater than that of the anode foil, or the size of the cathode foil is equal to that of the anode foil.

In the embodiments of the present disclosure, the quantity of the anode foils of the core package 10 may be 1 to 100, preferably 10 to 60.

Figure 6:
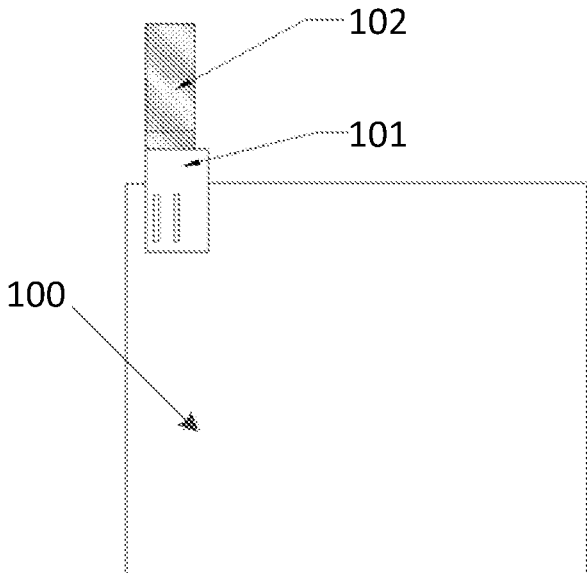
FIG. 6 is another schematic view showing the first electrode foil.

In the embodiments of the present disclosure, when the first electrode foils 100 are connected to the first conductive foil strip 102, e.g., by laser welding, as shown in FIG. 2, welding seams may be arranged along a transverse direction, i.e., a direction perpendicular to a direction from the first electrode foil 100 to the first conductive foil strip 102; or welding seams may also be arranged in a longitudinal direction, as shown in FIG. 6, i.e., a direction parallel to a direction from the first electrode foil 100 to the first conductive foil strip 102. In this regard, as long as the electrical connection between the first electrode foil 100 and the first conductive foil strip 102 is achieved, the specific connection manner thereof is not limited.

According to the core package in the embodiments of the present disclosure, capacitance extraction of the plurality of first electrode foils 100 is achieved through first conductive foils 101, and properties of the oxide film on the surface of the first conductive foil are the same as properties of an oxide film on a surface of the first electrode foil, so that when the aluminum electrolytic capacitor is used, there will not be no oxide film on the first conductive foil 101 or because of the different properties, the electrolyte will constantly repair or form an oxide film on the first conductive foil, thereby to avoid current accumulation and heating.

In addition, the thicknesses of the first conductive foil 101 and the second conductive foil 201 are much less than the thicknesses of the first electrode foil 100 and the second electrode foil 200, when the plurality of first electrode foils and the plurality of second electrode foils of the core package 10 are laminated one on another, the thickness of the connection portion between the anode foil and the first conductive foil 101 or between the anode foil and the second conductive foil 201 will not be increased greatly due to the setting of the first conductive foil 101 or the second conductive foil 201, so as to avoid the uneven contact surface between the anode foil and the electrolytic paper, thereby to prevent affecting the overall performance, e.g., stability and capacity extraction, of the core package 10.

The present disclosure further provides in some embodiments an aluminum electrolytic capacitor, including the above-mentioned core package.

In the embodiments of the present disclosure, the aluminum electrolytic capacitor further includes a first shell made of aluminum material with an opening at one end, and the core package is arranged inside the first shell; and the opening is provided with a first packaging cover plate, the first packaging cover plate is provided with a wiring post, and the first conductive foil strip is connected to the wiring post on the first packaging cover plate.

In the embodiments of the present disclosure, a size and a shape of the first shell are compatible with a size and a shape of the core package. In a possible embodiment of the present disclosure, the core package is formed into a square shape, and the first shell is formed into a square shape compatible with the size of the core package.

In the embodiments of the present disclosure, the core package is packaged by the first shell made of the aluminum material and the first packaging cover plate, and the core package includes the first electrode foil, the second electrode foil and the electrolytic paper being directly arranged inside the first shell and being sealed and packaged by the first packaging cover plate. In a possible embodiment of the present disclosure, the shell and the first packaging cover plate may be sealed by sealant or by laser welding.

In the embodiments of the present disclosure, the first conductive foil strip is an electrode tab and includes a conductive sheet and electrode tab adhesive arranged on the conductive sheet, the electrode tab adhesive is formed as a connection adhesive strip, and the first conductive foil strip is connected to the wiring post on the first packaging cover plate.

In a possible embodiment of the present disclosure, the first electrode foil is the anode foil; the core package further includes the second conductive foil strip or the third conductive foil strip coupled to the cathode foil; and similarly, the second conductive foil strip or the third conductive foil strip is connected to another wiring post on the first packaging cover plate, so as to achieve the capacitance extraction of the cathode foil.

The wiring post on the first packaging cover plate is connected to the first conductive foil strip and the second conductive foil strip (or the third conductive foil strip) at the inner side, and is connected to the circuit board at the outer side.

In the embodiments of the present disclosure, the core package in the first shell is immersed in electrolyte, which includes solvent, solute and additive.

The solvent includes a main solvent and an auxiliary solvent, the main solvent is ethylene glycol, the auxiliary solvent includes one or more of deionized water, glycerol, sorbitol, propylene glycol and butane-1, 4-diol, and the auxiliary solvent is optional.

The solute includes one or more of succinic acid, glutaric acid, adipic acid, ammonium adipate, ammonium octylate, ammonium azelate, ammonium sebate, ammonium 1, 7-sebacate, ammonium isosebacate, ammonium alkyl sebacate, ammonium dodecanoate, 2-hexyl adipate, boric acid, polyvinyl alcohol, polyethylene glycol, butyl phosphate, monobutyl phosphate, ammonium pentaborate, phenylic acid, p-phenylphthalic acid and citric acid.

The additive includes one or more of p-nitrophenol, o-nitrophenol, m-dinitrobenzene, p-nitroanisole or p-nitrobenzyl alcohol, and ammonium hypophosphate.

Figure 7:
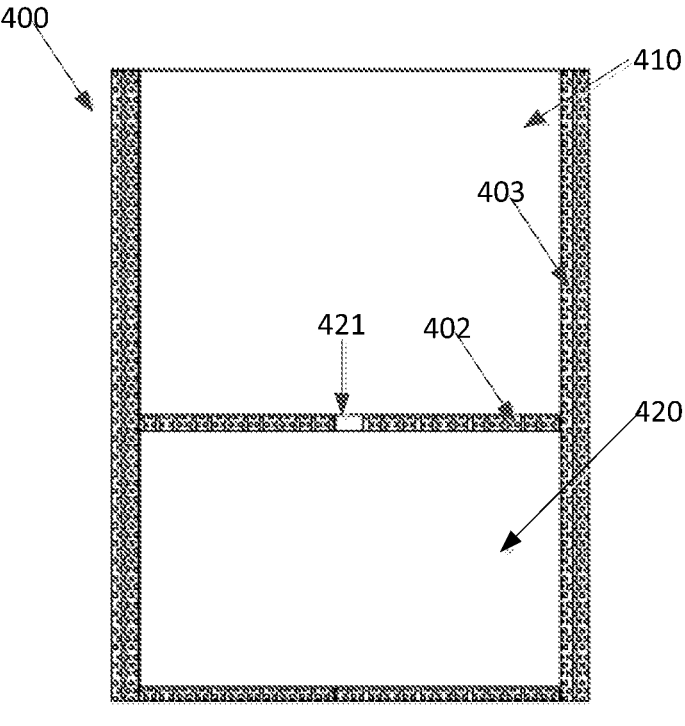
FIG. 7 is a schematic view showing a packaging bag.
Figure 8:
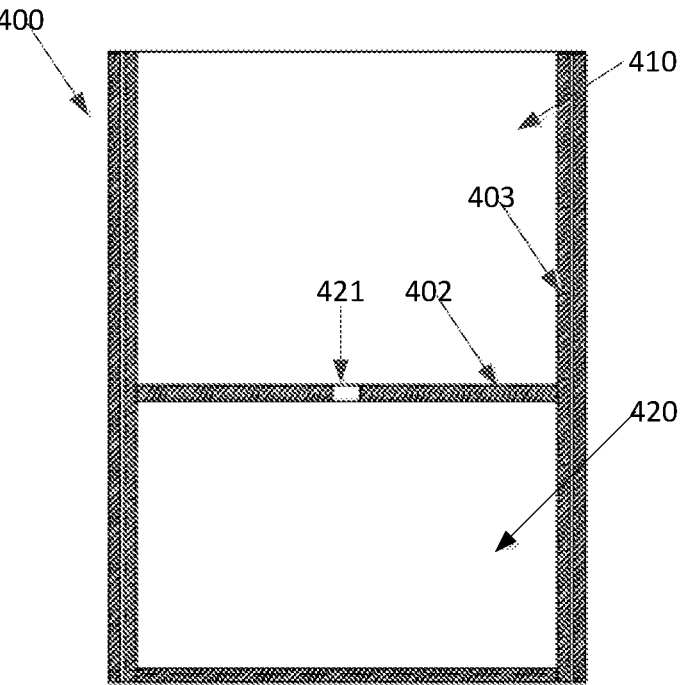
FIG. 8 is another schematic view showing the packaging bag.
Figure 9:
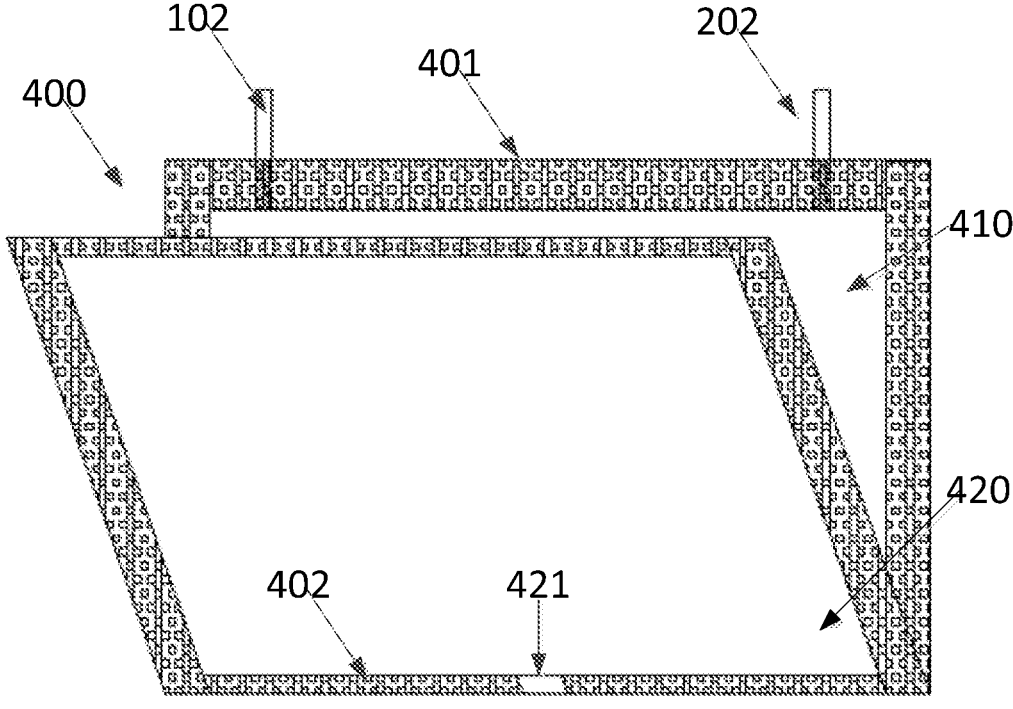
FIG. 9 is yet another schematic view showing the packaging bag.

The present disclosure further provides in some embodiments a core package, as shown in FIG. 7 to FIG. 9, in combination with FIG. 1, the aluminum electrolytic capacitor further includes a packaging bag 400 made of an aluminum-plastic film, the packaging bag 400 is formed as an accommodation cavity 410, an edge of the accommodation cavity 410 is sealed, the core package 10 is sealed inside the packaging bag 400, and the first conductive foil strip 102 extends to the outside of the packaging bag 400 by passing through a first sealing edge 401 of the packaging bag 10.

In this embodiment, the core package 10 may be packaged by the packaging bag 400 made of the aluminum-plastic film. In a possible embodiment of the present disclosure, the first conductive foil strip coupled to the anode foil and the second conductive foil strip or third conductive foil strip coupled to the cathode foil of the core package 10 are connected to the first sealing edge 401 through the connection adhesive strip 103 hermetically respectively.

After the core package 10 is arranged in the accommodation cavity 410 of the packaging bag 400, the first conductive foil strip and the second conductive foil strip (or the third conductive foil strip) are sealed thermally at an extension edge of the packaging bag 400 to form the first sealing edge 401.

The packaging method of the core package 10 is the same as that in the above embodiment, the core package in the accommodation cavity 410 is immersed in electrolyte, which includes solvent, solute and additive.

In a possible embodiment of the present disclosure, the packaging bag 400 further includes an airbag structure 420 spaced apart from the accommodation cavity 410 through a isolation strip 402, the isolation strip 402 is provided with an exhaust structure 421 connecting the airbag structure 420 with the accommodation cavity 410.

The exhaust structure 421 is formed as a via hole or a one-way pressure relief valve, and in a possible embodiment of the present disclosure, the exhaust structure 421 is arranged in the middle of the isolation strip 402.

In the embodiments of the present disclosure, the isolation strip 402 is sealed thermally.

The isolation strip 402 is opposite to the first sealing edge 401 of the packaging bag 400, or the isolation strip 402 is arranged at a side of the first sealing edge 402 adjacent to the isolation strip.

Combined with FIG. 7 to FIG. 9, a width of a second sealing edge 403 of the packaging bag 400 is greater than a width of the first sealing edge 401; and the second sealing edge 403 is arranged at both sides of the first sealing edge 401.

As shown in FIG. 8, the second sealing edge 403 includes at least two sealing isolation strips.

In this embodiment, the sealing isolation strip is sealed thermally. A width of each second sealing edge 403 on both sides of the first sealing edge 401 is greater than the width of the first sealing edge 401, so as to achieve the sealing effect of the packaging bag 400 during the thermally sealing of the second sealing edge 403 effectively.

As shown in FIG. 9, the packaging bag 400 is provided with the accommodation cavity 410 and the airbag structure 420 spaced from each other, and the airbag structure 420 may be folded relative to the accommodation cavity 410 through the sealing isolation strip 402 arranged between the accommodation cavity 410 and the airbag structure 420.

Figure 10:
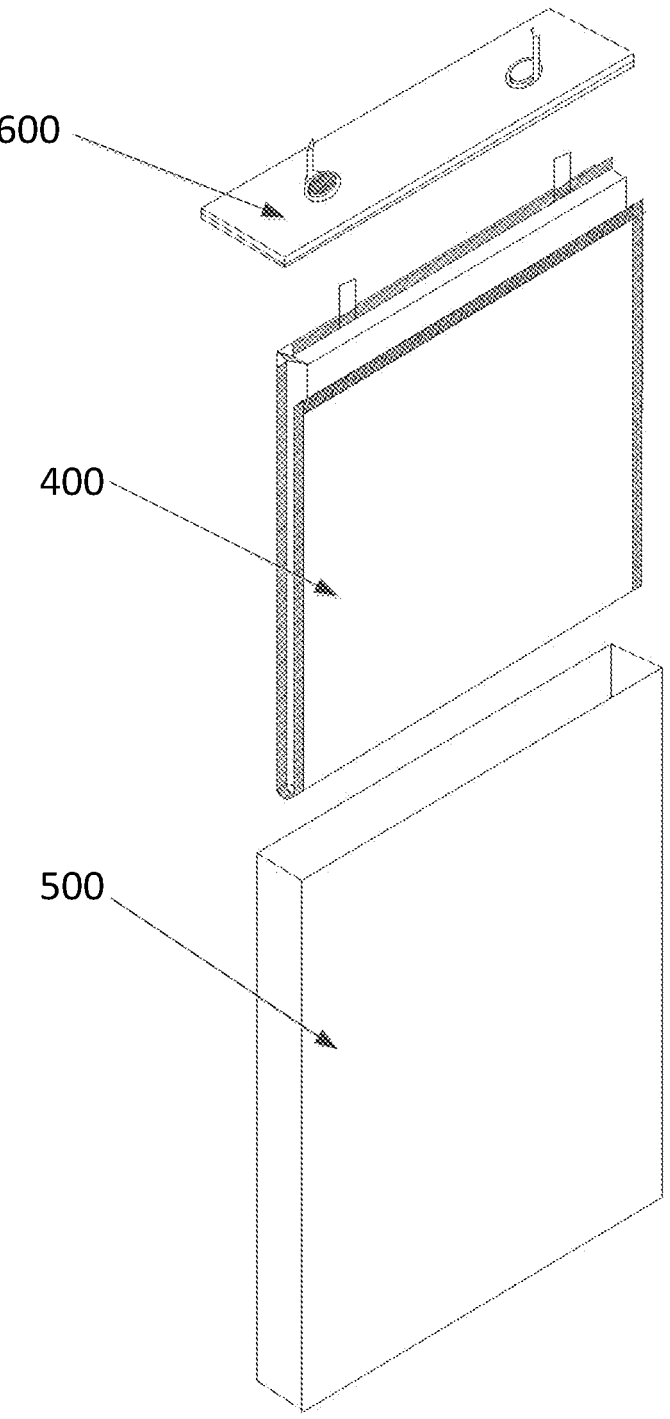
FIG. 10 is a schematic view showing a capacitor according to an embodiment of the present disclosure.

In the embodiments of the present disclosure, as shown in FIG. 10, the aluminum electrolytic capacitor further includes a second shell 500 made of the aluminum material with an opening at one end, and the packaging bag 400 containing the core package is arranged inside the second shell 500; and a second packaging cover plate 600 is arranged at the opening, a wiring post is arranged on the second packaging cover plate 600, and the first conductive foil strip is connected to the wiring post on the second packaging cover plate 600.

In this embodiment, the second shell 500 may be made of, but not limited to, aluminum material or polyurethane material.

In the embodiments of the present disclosure, inside the second shell 500, the airbag structure 420 is arranged at one side of the accommodation cavity 410, and a direction from the accommodation cavity 410 to the airbag structure 420 is a direction along which the plurality of first electrode foils and the plurality of second electrode foils are laminated one on another.

According to the embodiments of the present disclosure, as shown in FIG. 10, after the core package 10 is packaged in the accommodation cavity 410 and the airbag structure 420 is folded to one side relative to the accommodation cavity 410, the entire packaging bag 400 is arranged in the second shell 500. In a possible embodiment of the present disclosure, a small gap is reserved between the packaging bag 400 and the second shell 500 in the second shell 500.

According to the aluminum electrolytic capacitor in the embodiments of the present disclosure, in the process of use, when the accommodation cavity 410 is flatulent, the gas generated in the accommodation cavity 410 firstly enters the airbag structure 420 through the exhaust structure 421 communicating the airbag structure 420 with the accommodation cavity. The airbag structure 420 is arranged at a side of the accommodation cavity 410, so the accommodation cavity 410 will squeeze the core package in the accommodation cavity 410 when bulging, so as to make the core package more compact after being squeezed, thereby to achieve the effect of slowing down the attenuation rate of the capacitance extraction rate of the core package.

In addition, according to the aluminum electrolytic capacitor in the embodiments of the present disclosure, the gas generated by the core package is stored in the airbag structure 420 firstly, and will not rush out from the pressure relief valve on the aluminum shell like a conventional capacitor, so as to avoid splashing to the circuit board and accidents such as fire.

On the other hand, in the embodiments of the present disclosure, the first conductive foil strip (or the second conductive foil strip) is hermetically coupled to the packaging bag through the connection adhesive strip, and the connection strength at the connection adhesive strip is weaker than that at other portions, when the gas pressure generated in the packaging bag reaches a certain degree, the capacitor may be powered off after the breakage occurs at the sealing position of the connection adhesive strip and the packaging bag or at a connection position of the first conductive foil strip (or the second conductive foil strip) and the cathode foil, so that no more gas is generated, thereby to solve the problem that a large amount of gas rushes out and is splashed to the circuit board.

For example, a plurality of aluminum electrolytic capacitors in the embodiments of the present disclosure is tested under the test conditions of a voltage of 660V and a current of 1 A. After the power supply is turned on and the test conditions are reached instantly for 1 to 2 seconds, the second conductive foil strip on the cathode foil is broken at the aluminum-plastic sealing position or at the riveting position of the cathode foil (the cathode foil is very thin and easy to break).

Further, the packaging bag 400 is also arranged in the second shell 500, if the electrolyte in the core package leaks, it merely leaks in the second shell 500 and generally does not flow out, and the problem of splashing to the circuit board will not occur, thereby to achieve flame retardant effect.

Figure 11:
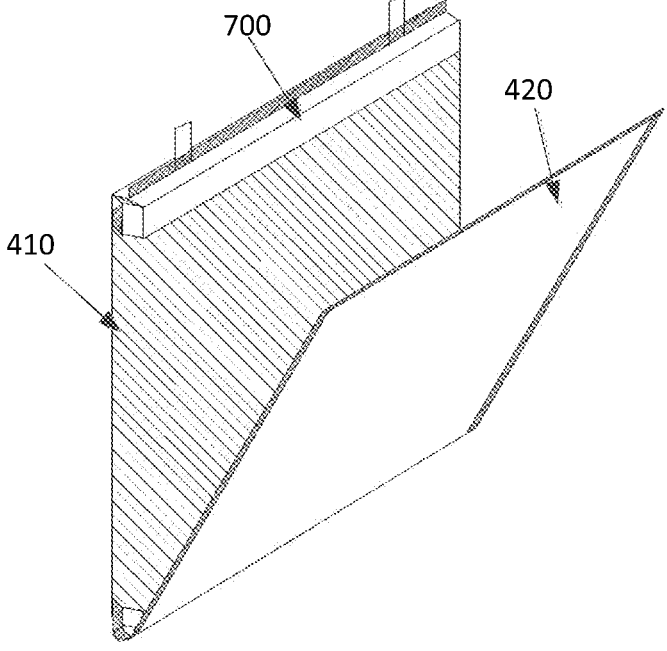
FIG. 11 is a schematic view showing a pressing clip arranged on the packaging bag according to an embodiment of the present disclosure.

In a possible embodiment of the present disclosure, a pressing clip 700 is further arranged inside the second shell 500, as shown in FIG. 11, the pressing clip 700 holds the accommodation cavity 410, and the airbag structure 420 is arranged at one side of the pressing clip 700.

In the embodiments of the present disclosure, the pressing clip 700 includes two splints opposite to each other to hold the accommodation cavity 410, so as to press the core package of the accommodation cavity 410 tightly.

According to the embodiments of the present disclosure, the accommodation cavity 410 is held by the pressing clip 700, when the core package in the accommodation cavity 410 generates gas during operation of the capacitor, the gas in the accommodation cavity 410 may reach the airbag structure 420 quickly through the pressing clip 700 and will not stay in the accommodation cavity 410, and reverse compression of the accommodation cavity 410 will not be affected by the gas in the airbag structure 420.

In the embodiments of the present disclosure, after the core package is packaged in the packaging bag 400, the packaging bag 400 may be attached to the core package tightly by vacuuming.

In the embodiments of the present disclosure, the packaging bag 400 is formed in advance, including forming the sealing isolation strip between the accommodation cavity and the airbag structure.

When the core package is packaged, the first conductive foil strip coupled to the anode foil and the second conductive foil strip coupled to the cathode foil are pasted with sealant for heat sealing, and then the packaging process of core packaging, vacuuming and heat sealing is executed.

In the embodiments of the present disclosure, the packaging bag may also be formed by arranging the core package on an aluminum-plastic film firstly, covering the core package with another aluminum-plastic film, and then forming the accommodation cavity and the airbag structure on the aluminum-plastic film through sealing the edge thermally.

During operation, the capacitor may generate heat due to ripple current, the electrolyte may be evaporated and the gas may be generated, so the evaporated electrolyte will also enter the airbag structure along the exhaust structure. In this regard, the core package needs to be immersed with enough electrolyte, in fact, the square laminated core package is not as tightly wound as the wound cylindrical core package, so the electrolyte is easier to immerse the whole core package, i.e., under a same immersion condition, the square laminated core package may be immersed with more electrolyte, and the performance of the capacitor will be better.

In addition, the core package is packaged by a packaging bag made of an aluminum-plastic film, so the sealing effect of the second shell on the core package is not as high as that of the conventional capacitor, and after the packaging bag is sealed in the second shell by the second packaging cover plate, the wiring post (extraction post) may be arranged in a same manner as a wiring post arranged on the conventional capacitor, but the sealing requirements of the second packaging cover plate and the second shell do not need to be so high, as long as the gas generated by the core package reaches a certain degree to burst the packaging bag, the electrolyte will not flow out of the second shell.

On the other hand, after the core package is packaged in the packaging bag 400, if the generated gas has a flatulence phenomenon during an aging test, through the aluminum electrolytic capacitor in the embodiments of the present disclosure, the gas enters the airbag structure 420 through the exhaust structure 421 to bulge the airbag structure 420. The gas in the airbag structure may be exhausted by vacuuming through cutting the airbag structure, and the cut may be sealed thermally.

According to the aluminum electrolytic capacitor in the embodiments of the present disclosure, the aluminum electrolytic capacitor further includes a second shell formed integrally, the packaging bag is arranged inside the second shell, the first conductive foil strip extends to the outside of the second shell, and the first conductive foil strip is sealed and insulated from the second shell.

In this embodiment, the second shell may be made of an aluminum shell, the packaging bag including the core package is arranged inside the second shell made of an integrally formed aluminum shell and extends to the outside of the second shell through the first conductive foil strip and the second conductive foil strip (or the third conductive foil strip) to achieve the capacitance extraction. The first conductive foil strip and the second conductive foil strip (or the third conductive foil strip) may be sealed and insulated from the second shell through a rubber plug.

In this embodiment, similar to the packaging bag containing the core package in the previous embodiment, which is packaged by the second shell with one opening and the second packaging cover plate, the packaging bag further includes an airbag structure and a pressing clip for holding the accommodation cavity. Specific embodiments of the present disclosure may be referred to the description of airbag structure and the pressing clip above, and thus will not be particularly defined herein.

The present disclosure further provides in some embodiments a packaging method, for the above-mentioned aluminum electrolytic capacitor, and the method includes: arranging the core package in an accommodation cavity of a packaging bag, a first conductive foil strip of the core package protruding out of an opening of the packaging bag, and the packaging bag being made of an aluminum-plastic film; and thermally sealing the packaging bag at the opening to form a first sealing edge, and connection colloid on the first conductive foil strip is thermally sealed with the packaging bag.

In the embodiments of the present disclosure, the packaging bag further includes an airbag structure spaced apart from the accommodation cavity through a sealing isolation strip, the sealing isolation strip is provided with an exhaust structure connecting the airbag structure with the accommodation cavity. The method further includes folding the airbag structure to one side of the packaging bag; arranging the packaging bag with the folded airbag structure in a second shell; arranging a second packaging cover plate at the opening of the second shell and connecting the first conductive foil strip with a wiring post on the second packaging cover plate; and sealing the second packaging cover plate to seal the packaging bag inside the second shell.

To be specific, the packaging method and packaging process of the aluminum electrolytic capacitor may be referred to the description above, and thus will not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A core package, comprising:
a plurality of first electrode foils and a plurality of second electrode foils laminated one on another, wherein every two adjacent first electrode foils are spaced by one of the plurality of second electrode foils, every two adjacent second electrode foils are spaced by one of the plurality of first electrode foils, the first electrode foil and the second electrode foil adjacent to each other are spaced by an electrolytic paper; and each of the first electrode foils is either of an anode foil and a cathode foil, and each of the second electrode foils is the other of the anode foil and the cathode foil;
wherein among the plurality of first electrode foils, a first conductive foil is arranged at an edge of each of the first electrode foils, a first portion of the first conductive foil is electrically coupled to the corresponding first electrode foil, and a second portion of the first conductive foil extends and protrudes relative to the corresponding first electrode foil; and a plurality of first conductive foils are connected to one first conductive foil strip through the second portions; and
wherein an oxide film is formed on a surface of the first conductive foil;
wherein each of the first electrode foils comprises a main body portion and an electrode tab portion formed integrally, the electrode tab portion protrudes relative to an edge of the main body portion, and the first portion of the first conductive foil is connected to the first electrode foil through the electrode tab portion; and
wherein the electrode tab portions of the plurality of first electrode foils are staggered in sequence along a first direction.

2. The core package according to claim 1, wherein among the plurality of second electrode foils, a second conductive foil is arranged at an edge of each of the second electrode foils, a first portion of the second conductive foil is electrically coupled to the corresponding second electrode foil, and a second portion of the second conductive foil extends and protrudes relative to the corresponding second electrode foil; and a plurality of the second conductive foils is connected to one second conductive foil strip through the second portions; and
wherein an oxide film is formed on a surface of the second conductive foil.

3. The core package according to claim 1, wherein the first conductive foil is made of pure aluminum material, and properties of the oxide film on the surface of the first conductive foil are the same as that of an oxide film on a surface of the first electrode foil.

4. The core package according to claim 1, wherein the oxide film is formed on the surface of the first conductive foil through a chemical formation process, and the chemical formation process used for forming the oxide film on the surface of the first conductive foil is the same as that for forming the oxide film on the surface of the first electrode foil.

5. The core package according to claim 1, wherein the first electrode foil is the anode foil and the second electrode foil is the cathode foil; and
each of the cathode foils comprises a main body portion and an electrode tab portion formed integrally, the electrode tab portion protrudes relative to an edge of the main body portion, and the plurality of cathode foils are connected to one third conductive foil strip through the electrode tab portions.

6. The core package according to claim 1, wherein the plurality of first conductive foils are arranged in sequence along a first direction, and the second portions of two adjacent first conductive foils are attached to each other.

7. The core package according to claim 1, wherein a thickness of the first conductive foil ranges from 5 µm to 50 µm.

8. An aluminum electrolytic capacitor, comprising the core package according to claim 1.

9. The aluminum electrolytic capacitor according to claim 8, wherein the aluminum electrolytic capacitor further comprises a first shell made of aluminum material with an opening at one end, and the core package is arranged inside the first shell; and
the opening is provided with a first packaging cover plate, the first packaging cover plate is provided with a wiring post, and the first conductive foil strip is connected to the wiring post on the first packaging cover plate.

10. The aluminum electrolytic capacitor according to claim 9, wherein a size and a shape of the first shell are compatible with that of the core package.

11. The aluminum electrolytic capacitor according to claim 8, wherein the aluminum electrolytic capacitor further comprises a packaging bag made of an aluminum-plastic film, the packaging bag is formed as an accommodation cavity, an edge of the accommodation cavity is sealed, the core package is sealed inside the packaging bag, and the first conductive foil strip extends to the outside of the packaging bag by passing through a first sealing edge of the packaging bag.

12. The aluminum electrolytic capacitor according to claim 11, wherein the aluminum electrolytic capacitor further comprises a second shell made of the aluminum material with an opening at one end, and the packaging bag containing the core package is arranged inside the second shell; and a second packaging cover plate is arranged at the opening, a wiring post is arranged on the second packaging cover plate, and the first conductive foil strip is connected to the wiring post on the second packaging cover plate.

13. The aluminum electrolytic capacitor according to claim 12, wherein the packaging bag further comprises an airbag structure spaced apart from the accommodation cavity through an isolation strip; the isolation strip is provided with an exhaust structure connecting the airbag structure with the accommodation cavity; and inside the second shell, the airbag structure is arranged at one side of the accommodation cavity, and a direction from the accommodation cavity to the airbag structure is the direction along which the plurality of first electrode foils and the plurality of second electrode foils are laminated one on another.

14. The aluminum electrolytic capacitor according to claim 13, wherein a pressing clip is further arranged inside the second shell, the pressing clip holds the accommodation cavity, and the airbag structure is arranged at one side of the pressing clip.

15. The aluminum electrolytic capacitor according to claim 13, wherein the isolation strip is opposite to the first sealing edge of the packaging bag, or the isolation strip is arranged at a side of the first sealing edge adjacent to the isolation strip.

16. The aluminum electrolytic capacitor according to claim 11, wherein the aluminum electrolytic capacitor further comprises a second shell formed integrally, the packaging bag is arranged inside the second shell, the first conductive foil strip extends to the outside of the second shell, and the first conductive foil strip is sealed and insulated from the second shell.

17. The aluminum electrolytic capacitor according to claim 11, wherein a width of a second sealing edge of the packaging bag is greater than a width of the first sealing edge; and the second sealing edge is arranged at both sides of the first sealing edge.

18. A packaging method, applied to the aluminum electrolytic capacitor according to claim 8, wherein the method comprises:

arranging the core package in an accommodation cavity of a packaging bag, a first conductive foil strip of the core package protruding out of an opening of the packaging bag, the packaging bag is made of an aluminum-plastic film; and thermally sealing the packaging bag at the opening to form a first sealing edge, and connection colloid on the first conductive foil strip is thermally sealed with the packaging bag.

19. The packaging method according to claim 18, wherein the packaging bag further comprises an airbag structure spaced apart from the accommodation cavity through a sealing isolation strip, the sealing isolation strip is provided with an exhaust structure connecting the airbag structure with the accommodation cavity, and the method further comprises:

folding the airbag structure to one side of the packaging bag;

arranging the packaging bag with the folded airbag structure in a second shell;

arranging a second packaging cover plate at the opening of the second shell and connecting the first conductive foil strip with a wiring post on the second packaging cover plate; and sealing the second packaging cover plate to seal the packaging bag inside the second shell.

* * * * *